United States Patent Office 3,135,859
    Patented June 2, 1964

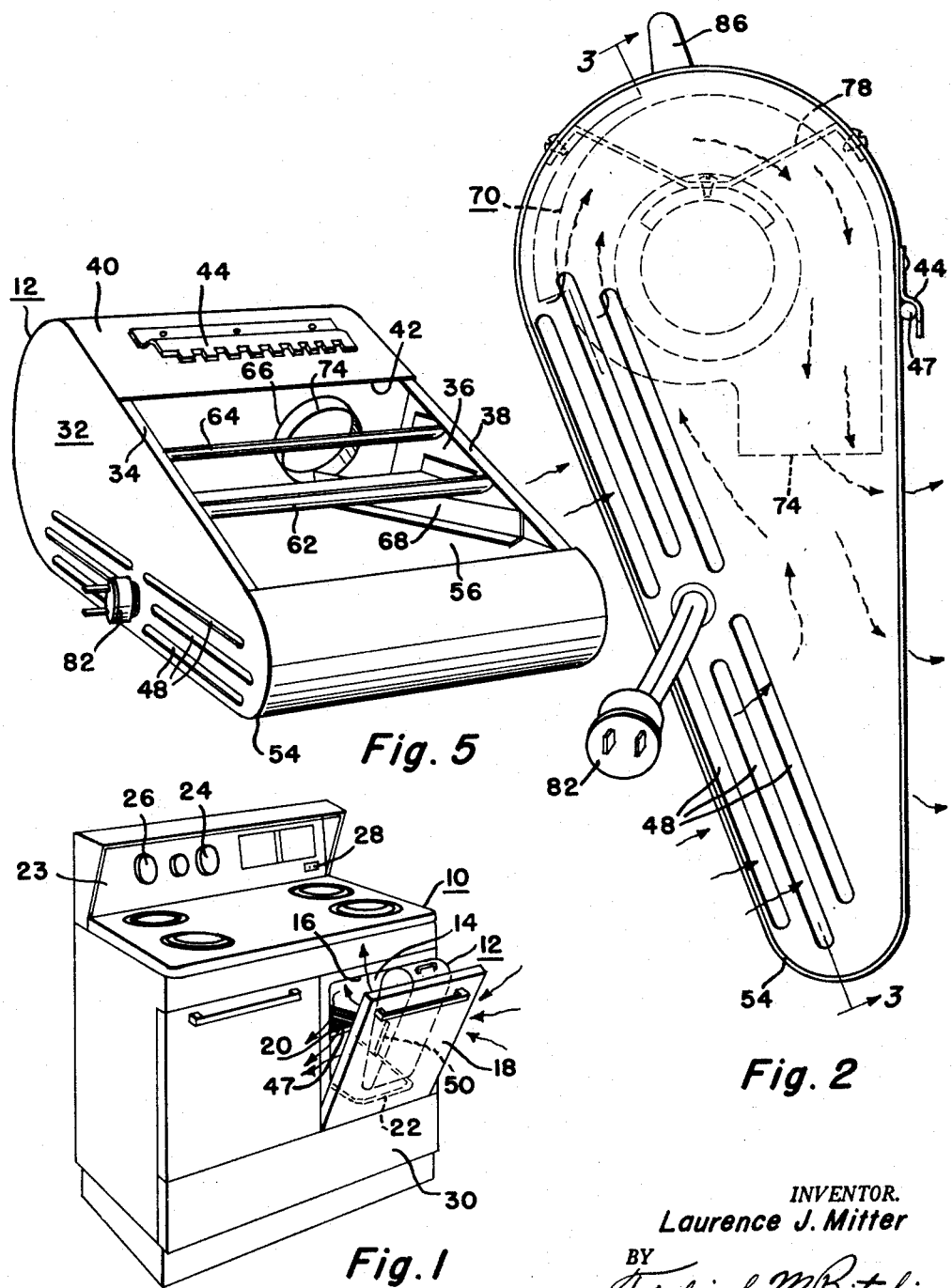

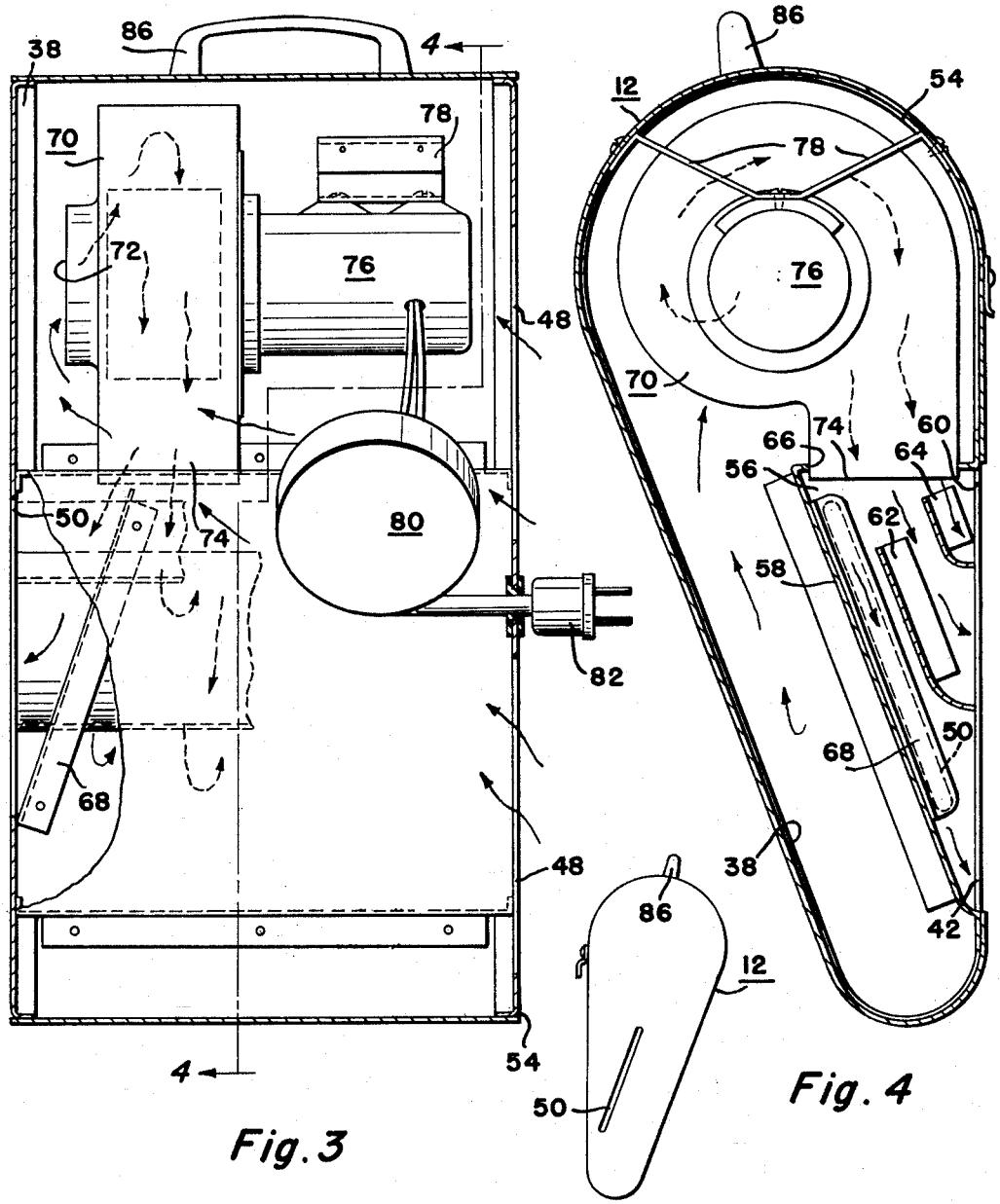

3,135,859
    BLOWER ACCESSORY FOR AN OVEN
    Laurence J. Miller, Dayton, Ohio, assignor to General
    Motors Corporation, Detroit, Mich., a corporation of
    Delaware
    Filed Feb. 27, 1961, Ser. No. 91,780
    4 Claims. (Cl. 219—369)

This invention relates to a domestic appliance and more particularly to a combination electric cooking appliance and space heater and also more particularly to a blower accessory for converting an electric oven to a space heater.

It is recognized that many persons who own electric ranges occasionally use the ovens thereof as the means for heating the kitchen or space in which the electric range is placed. Generally speaking, the oven of an electric range is energized with the oven door left standing ajar so that the kitchen air will be heated somewhat by natural convection. Such use tends to overheat and warp the oven walls since the oven thermostat is not sufficiently effective when the oven door is open. In addition, the life of the tubular sheathed oven heating elements is unduly shortened when they are overheated. Thus, it is a general object of this invention to provide a blower accessory for converting the oven of an electric range into a room heater in a manner which will protect the oven liner walls and the heating elements from overheating.

Accordingly, it is an object of this invention to provide means for inducing a forced draft of air from the surrounding atmosphere into the oven chamber for heating the surrounding atmosphere.

A more particular object of this invention is the provision of a blower accessory which mounts between the access opening to an oven and the oven door when the oven door is slightly ajar.

A further object of this invention is the provision of an air impelling means which mounts on the oven rack and is adapted to force room air into the oven and over the oven heating element, subsequently returning the heated air to the surrounding atmosphere for heating the room in which the electric range is placed.

A further object of this invention is the provision of a blower accessory for an electric range having an automatically timed power supply outlet for selectively energizing the blower accessory connected thereto.

A more specific object of this invention is the provision with an oven of a generally wedge-shaped blower housing having an inlet opening in communication with the surrounding atmosphere, a first outlet opening in communication with the interior of the oven, a second outlet for inducing lateral flow of heated air from said oven and a retractable electric supply means for energizing the blower from said oven.

Further objects and advantages of the present invention will be apparent from the following description, reference being had to the accompanying drawings wherein preferred embodiments of the present invention are clearly shown.

In the drawings:

FIGURE 1 is a perspective view of an electric range provided with the blower accessory of this invention;

FIGURE 2 is an elevational view of one side of the blower accessory of this invention with one form of attachment bracket;

FIGURE 3 is a fragmentary sectional view taken generally in the direction of 3—3 in FIGURE 2;

FIGURE 4 is a sectional view taken along line 4—4 in FIGURE 3;

FIGURE 5 is a perspective view of the blower accessory of this invention; and

FIGURE 6 is an elevational view of an other side of this invention.

In accordance with this invention and with reference to FIGURE 1, an electric range 10 is shown provided wtih a removable blower accessory, shown generally at 12. The electric range 10 is provided with an oven liner 14 having an access opening 16 closed by a horizontally pivotally mounted oven door 18. Within the oven liner 14 a welded wire support rack or member 20 may be slidably positioned for removal through the front access opening 16. Along the bottom of the oven liner is a tubular sheathed bake heating element 22 which is selectively energized to maintain temperatures within the oven liner in accordance with a conventional oven thermostatic control. It is also within the purview of this invention to include a similar heating element on the top of the oven liner which is generally designated in the art as the broil heating element.

The bake heating element 22 may be selectively energized in accordance with a temperature responsive device which has a manually operable dial 24 on the console 23 of the range for presetting oven temperatures. To effect a timed operation of the oven heating element 22, a clock 26 is provided and adapted to energize the heating element 22 for the temperature selected at dial 24 in accordance with a predetermined time interval or schedule. The console of the electric range 10 also includes a utility receptacle or power supply outlet 28 which may operate in conjunction with the clock 26 so that the power receptacle 28 is conditioned for energization during the time interval preselected on the clock 26.

Beneath the oven 14 a slidably removable storage drawer 30 is available for storing the blower accessory 12 when not in the operating position shown in FIGURE 1.

Referring now to FIGURE 5, the blower accessory 12 is shown comprised of a casing 54 having a first or right-hand side panel 32 with an inwardly turned peripheral flange 34. Opposite the right-hand sidewall 32 is a second or left-hand sidewall 36 which is configured similarly to the sidewall 32 and which also includes a peripheral flange 38. Joining the left and right-hand sidewalls 32 and 36 is a cover or partial envelope 40 which circumscribes a portion of the sidewalls 32 and 36 having the ends thereof terminate short of joining to define with the peripheral flanges 34 and 38 a primary blower outlet 42. A catch or blower attachment bracket 44 is attached in any conventional fashion to the cover 40 and is adapted to fasten the blower 12 to the rod member 47 of the oven rack 20 (FIGURE 5).

Generally speaking and with reference to FIGURES 1 and 5, the blower accessory 12 is provided with air inlet openings 48, a primary air outlet opening 42 and a secondary or side thrust outlet 50.

More particularly the interior construction of the blower accessory 12 will be described in connection with FIGURE 4. The sidewalls 32 and 36 form with the cover 40 a casing shown generally at 54. The casing 54 encloses an air duct 56 which has upturned side flanges 58 for attaching the sides of the air duct respectively to the casing sidewalls 32 and 36. The air duct 56 has an outlet 60 which is coextensive with the primary outlet 42 in the casing 54. Within the air duct 56 and substantially in line therewith is a center baffle 62 and a top baffle 64. These baffles 62 and 64 form flow channels between the duct outlet 60 and a duct inlet 66. Also disposed within the air duct 56 is a side baffle 68 which by-passes a portion of the air entering the air duct through the inlet 66 through the side outlet 50. Thus any air entering the air duct 56 through the inlet 66 is channeled by the various baffles through either the primary outlet 42 or the side outlet 50.

The blower casing 54 also encloses an air impeller or centrifugal blower 70 which has an inlet opening 72 and an oulet portion 74 extending through the air duct inlet 66 to direct air past the baffles 62, 64 and 68. The air impeller 70 is driven by a motor or prime mover 76 which is supported by a bracket 78 attached by any conventional method to the inside of the cover 40. Thus, the air impeller and motor assembly is supported in spaced relation to the inside walls of the casing 54 in a manner to position the impeller outlet in the air duct 56. A power supply for the motor 76 may be a cord reel 80 and retractable electrical plug 82 which may be withdrawn from the casing 54 in order to attach the blower accessory 12 to a power source, such as the power supply outlet 28 on the console of the electric range. For convenience in moving and handling the blower accessory 12, a handle 86 is provided on the upper end thereof.

In operation, the blower accessory 12 is removed from the storage door 30 and positioned between a partially open oven door 18 and the access opening 16 of the oven—the blower accessory being supported in this position by the engagement of the hanger or catch 44 with the support rack 20 of the oven compartment. Next, the power supply cord plug 82 is withdrawn and engaged with any domestic power source. Where a timed blower operation is desired, the plug 82 may be positioned in the clock controlled power supply outlet 28 on the range. Thus, the blower 12 will become energized whenever the outlet 28 is hot in accordance with a predetermined time setting on the clock 26. Also controlled by the oven clock 26 is the oven heater, such as bake heating element 22.

Assuming now that an operator of the range 10 desires additional heat for the kitchen or area in which the range is positioned, she will place her blower accessory 12 in the position illustrated in FIGURE 1. If she desires this additional heat in the kitchen prior to the time she awakes in the morning, she will preset the oven clock 26 to bring on the heating element 22 and the blower 12 in advance of the time she gets up. At the preset time the blower 12 will be energized, as will the heating element 22—the thermostat 24 being set at some elevated temperature to insure energization of the bake unit 22. With the impeller 70 energized, air will be drawn into the casing 54 through the inlet openings 48 (see air flow arrows in FIGURES 2, 3 and 4). Note in FIGURE 1 that the blower casing 54 is positioned so that the right-hand side 32 is closely adjacent the right-hand side of the oven 14. This locates the blower accessory so that room air is drawn into the blower unit. The air is discharged from the impeller into the air duct 56 which, with baffles 62 and 64, directs the air across the heating element 22, up the back wall of the oven 14 and across the top wall of the oven, which may or may not include a broil heating element (not shown). The air thus heated is then forced out of the top of the oven cavity—the thrust of air through the side outlet 50 serving to deflect a portion of the heated air laterally into the kitchen or surrounding area.

Thus, it should be seen that an improved removable, selectively time controlled blower is provided for effecting in combination with an oven supplementary heat for the area in which the range 10 is positioned. The invention here disclosed will permit use of an electric range as an auxiliary heater for the kitchen. Further, it will prevent over-heating of the oven heating element and will prevent warpage of the oven liner occasioned by extended heating periods without forced air. The blower accessory 12 is compact and easily stored within a bottom portion of the range and is readily positioned for operation on the oven rack or any other suitable support means between the oven access opening and the door.

While the embodiments of the present invention as herein disclosed, constitute preferred forms, it is to be understood that other forms might be adopted.

What is claimed is as follows:

1. In combination, an oven having a power supply receptacle and heater, preselectable clock means for energizing said power supply receptacle and said heater during the time interval preselected, said oven having an access opening and a horizontally pivotally mounted door partially opening said access opening and forming with said oven wedge-shaped openings on opposite sides of said door, an oven rack supported in said oven and having a rod member, a blower having a wedge-shaped casing configured to nest between said access opening and said partially open door, said casing defined by a first sidewall, a second sidewall and a cover, said casing having a primary air inlet in said first sidewall in communication with the atmosphere through the wedge-shaped opening on one side of said door, a secondary air outlet in said second sidewall facing the wedge-shaped opening on the other side of said door and a primary outlet defined by said cover and said sidewalls and in air flow directing heat transfer relationship with said heater, an air duct in said casing having an air duct inlet and an air duct outlet coextensive with said primary air outlet, a center baffle in said air duct and fastened to said sidewalls, a top baffle in said air duct and fastened to said sidewalls, and a side baffle in said air duct having one end adjacent said secondary air outlet and the other end thereof in air by-pass relationship with said air duct inlet, an air impeller mounted in said casing and having an air impeller inlet in communication with said primary air inlet and an air impeller outlet in line with said air duct inlet, a prime mover for driving said air impeller, a retractable electrical supply cord adapted to connect electrically with said power supply receptacle for providing said prime mover with timed operation, and a hanger on said casing for attaching said blower to said rod member with said primary outlet facing said access opening, thereby to condition said blower to force air into said oven and into heat exchange relationship with said clock controlled heater for selectively heating the atmosphere above said oven, said side baffle diverting a portion of said air through said secondary air outlet to thrust the heated air laterally from the wedge-shaped opening on said other side of the door for heating the atmosphere beside said oven.

2. A blower for directing air into a cavity comprising a wedge-shaped casing defined by a first sidewall, a second sidewall and a cover, said casing having a primary air inlet in said first sidewall, a secondary air outlet in said second sidewall and a primary outlet defined by said cover and said sidewalls, an air duct in said casing having an air duct inlet and an air duct outlet substantially coextensive with said primary air outlet, a center baffle in said air duct and fastened to said sidewalls, a top baffle in said air duct and fastened to said sidewalls, said center and top baffles serving to streamline air flow in said duct, and a side baffle in said air duct having one end adjacent said secondary air outlet and the other end thereof in air by-pass relationship with said air duct inlet, an air impeller mounted in said casing and having an air impeller inlet in communication with said primary air inlet and an air impeller in line with said air duct inlet, a prime mover for driving said air impeller, an electrical supply cord for said prime mover, and a hanger on said casing for attaching said blower relative to said cavity, thereby to condition said blower to force air into said cavity from the surrounding atmosphere.

3. A blower for directing air into a cavity comprising a casing defined by a first sidewall, a second sidewall and a cover, said casing having a primary air inlet in said first sidewall, a secondary air outlet in said second sidewall and a primary outlet defined by said cover and said sidewalls, an air duct in said casing having an air duct inlet and an air duct outlet in communication with said primary air outlet, a center baffle in said air duct and fastened to said sidewalls, a top baffle in said air duct and fastened to said sidewalls, said center and top baffles serving to streamline air flow in said duct, and a side baffle in said air duct having one end adjacent said secondary air outlet and the other end thereof in air by-pass relationship with said air duct inlet, an air impeller mounted in said casing and having an air impeller inlet in communication with said primary air inlet and an air impeller in line with said air duct inlet, a prime mover for driving said air impeller, electrical supply means for said prime mover, and means on said casing for attaching said blower relative to said cavity, thereby to condition said blower to force air into said cavity from the surrounding atmosphere.

4. In combination, an oven having a power supply receptacle and heater, preselectable clock means for energizing said power supply receptacle and said heater during the time interval preselected, said oven having an access opening and a pivotally mounted door partially opening said access opening and forming with said oven wedge-shaped openings on opposite sides of said door, a blower configured to nest between said acces opening and said partially open door and supported therebetween for directing air into said oven and into heat exchange relationship with said heater, said blower comprising a wedge-shaped casing defined by a first sidewall, a second sidewall and a cover, said casing having a primary air inlet in said first sidewall in communication with the atmosphere through the wedge-shaped opening on one side of said door, a secondary air outlet in said second sidewall facing the wedge-shaped opening on the other side of said door and a primary outlet defined by said cover and said sidewalls and in air flow directing heat transfer relationship with said heater, an air duct in said casing having an air duct inlet and an air duct outlet in communication with said primary air outlet, a center baffle in said air duct and fastened to said sidewalls, said center baffle serving to streamline air flow in said duct, and a side baffle in said air duct having one end adjacent said secondary air outlet and the other end thereof in air by-pass relationship with said air duct inlet, an air impeller mounted in said casing and having an air impeller inlet in communication with said primary air inlet and an air impeller in line with said air duct inlet, a prime mover for driving said air impeller, and electrical supply means for said prime mover connected to said power supply receptacle, thereby to condition said blower to force outside air into said oven from the surrounding atmosphere through the wedge-shaped opening on said one side of said door and to force some heated air out of the oven for heating the atmosphere on one side of the oven, said side baffle diverting a portion of said outside air through said secondary air outlet to thrust some heated air outwardly from the wedge-shaped opening on said other side of the door for heating the atmospher on another side of said oven.

References Cited in the file of this patent
UNITED STATES PATENTS

| | | |
|---|---|---|
| 2,083,145 | Campbell | June 8, 1937 |
| 2,108,111 | Ehrlich | Feb. 15, 1938 |
| 2,362,316 | Sims | Nov. 7, 1944 |
| 2,654,824 | Schroeder | Oct. 6, 1953 |